United States Patent [19]

Portugall et al.

[11] Patent Number: 4,797,465

[45] Date of Patent: Jan. 10, 1989

[54] WHOLLY AROMATIC MESOMORPHIC POLYETHER ESTERS AND THE PREPARATION THEREOF

[75] Inventors: Michael Portugall, Wachenheim; Gerd Blinne, Bobenheim; Hans-Josef Sterzel, Dannstadt-Schauernheim, all of Fed. Rep. of Germany

[73] Assignee: BASF Aktiengesellschaft, Ludwigshafen, Fed. Rep. of Germany

[21] Appl. No.: 938,050

[22] Filed: Dec. 4, 1986

[30] Foreign Application Priority Data

Dec. 4, 1985 [DE] Fed. Rep. of Germany ....... 3542778

[51] Int. Cl.$^4$ ............................................. C08G 63/60
[52] U.S. Cl. .................................... 528/176; 528/125; 528/127; 528/128; 528/193
[58] Field of Search ............... 528/176, 125, 128, 193, 528/127

[56] References Cited

U.S. PATENT DOCUMENTS

| | | | |
|---|---|---|---|
| 4,118,372 | 10/1978 | Schaefgen | 528/190 |
| 4,196,275 | 4/1980 | Go | 528/173 |
| 4,375,530 | 3/1983 | Hay et al. | 524/605 |
| 4,458,039 | 7/1984 | Eickman | 523/216 |
| 4,473,682 | 9/1984 | Calundann et al. | 524/605 |
| 4,499,256 | 2/1985 | Blundell et al. | 528/172 |
| 4,522,974 | 6/1985 | Calundann et al. | 524/605 |
| 4,540,737 | 9/1985 | Wissbrun et al. | 528/176 |
| 4,564,669 | 1/1986 | Dicke et al. | 528/173 |
| 4,639,504 | 1/1987 | Cottis | 528/176 |

FOREIGN PATENT DOCUMENTS

| | | |
|---|---|---|
| 0081900 | 6/1983 | European Pat. Off. |
| 0102160 | 3/1984 | European Pat. Off. |
| 0131846 | 7/1984 | European Pat. Off. |
| 0139303 | 5/1985 | European Pat. Off. |

*Primary Examiner*—John Kight
*Assistant Examiner*—M. L. Moore
*Attorney, Agent, or Firm*—Keil & Weinkauf

[57] ABSTRACT

Wholly aromatic mesomorphic polyesters which form a liquid-crystalline fiber-forming melt below 320° C. and are composed of (a) not less than 10 mol % of repeat units of the formula I

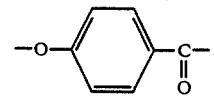

(b) a molar amount equivalent to the total amount of components (c) and (d) of repeat units of the formula II

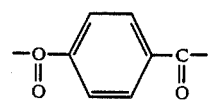

(c) from 3 to 20 mol % of repeat units of the formulae III and/or IV

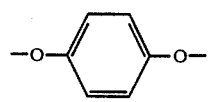

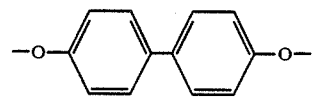

and (d) from 5 to 30 mol % of repeat units of the formula V

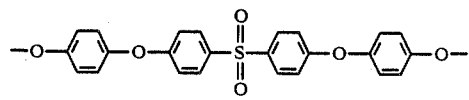

the molar proportions of components a, b, c and d adding up to 100 mol % in each case, the preparation thereof and moldings and coatings prepared therefrom.

7 Claims, No Drawings

WHOLLY AROMATIC MESOMORPHIC POLYETHER ESTERS AND THE PREPARATION THEREOF

The present invention relates to wholly aromatic mesomorphic polyether esters which form a liquid-crystalline fiber-forming melt below 320° C.

Liquid-crystalline polyesters are known. However, these polymers are in need of improvement in heat distortion resistance, processability and in particular surface quality, especially abrasion resistance. EP-A-No. 115,967 describes polyesters which are based for example on hydroxynaphthalenecarboxylic acid, hydroquinone and terephthalic acid. To improve the surface quality, these polymers are supposed to contain wollastonite. However, the addition of fillers has an adverse effect on other properties. Furthermore, EP-A-No. 102,160 discloses liquid-crystalline polyesters which are based on p-hydroxybenzoic acid, terephthalic acid, aromatic dihydroxy compounds and a reduced amount of hydroxynaphthalenecarboxylic acid. However, the liquid-crystalline polyesters described therein have a glass transition temperature of 110° C. and therefore are in need of improvement in heat distortion resistance. EP-A-No. 81,900 describes liquid-crystalline polyester amides and polyesters which can be based on a large number of aromatic dicarboxylic acids and aromatic dihydroxy compounds. One repeat unit mentioned, inter alia, is 4,4'-di(p-hydroxyphenoxy)-diphenyl sulfone. However, no indication is given as to which composition is necessary to obtain the desired properties.

It is an object of the present invention to provide wholly aromatic mesomorphic polyether esters which form a liquid-crystalline fiber-forming melt below 320° C. and are thus easier to process, and which have a high heat distortion resistance, a high abrasion resistance and high resilience.

We have found that this object is achieved with wholly aromatic mesomorphic polyether esters which form a liquid-crystalline fiber-forming melt below 320° C. and are composed of (a) not less than 10 mol % of repeat units of the formula I

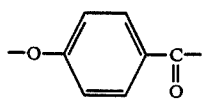

(b) a molar amount equivalent to the total amount of components (c) and (d) of repeat units of the formula II

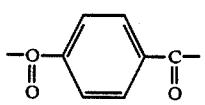

(c) from 3 to 20 mol % of repeat units of the formulae III and/or IV

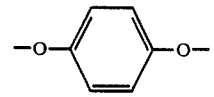

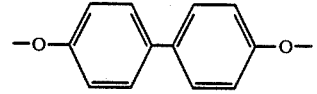

and (d) from 5 to 30 mol % of repeat units of the formula V

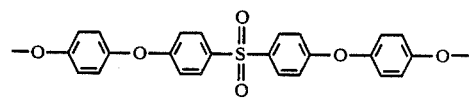

the molar proportions of components a, b, c and d adding up to 100 mol % in each case.

The novel wholly aromatic polyether esters have the advantage of having a high heat distortion resistance and a smooth abrasion-resistant surface. The novel wholly aromatic polyether esters further have the advantage of being processable below 320° C. and of having a high stiffness, strength and resilience. The novel polyether esters further have the advantage of low flammability.

The liquid-crystalline state of the polyether esters can be detected with a polarization microscope by a method described in German Published Application DAS No. 2,520,819. Applied in a thickness of 10 μm between glass plates and viewed between crossed polarizers, the polymer melts have textures which can be ascribed to a mesomorphic phase.

The polyether esters according to the invention are composed of (a) not less than 10 mol % of complete units of the formula I

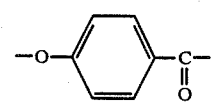

the starting material used being 4-hydroxybenzoic acid, (b) a molar amount equivalent to the total amount of components (c) and (d) of repeat units of the formula II

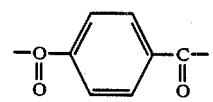

the starting compound used is advantageously terephthalic acid, (c) from 3 to 20 mol % of repeat units of the formula III and/or IV:

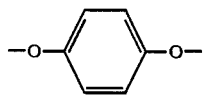

the starting compound used being for example hydroquinone;

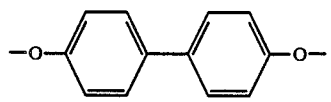

the starting compound used being for example 4,4'-dihydroxybiphenyl, and (d) from 5 to 30 mol % of repeat units of the formula V

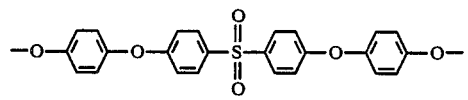

the starting compound used being advantageously 4,4'-di-(p-hydroxyphenoxy)diphenyl sulfone.

Preferred polyether esters are composed of not less than 20 mol %, advantageously up to 50 mol %, of component (a), from 10 to 25 mol % of component (d), from 5 to 15 mol % of component (c) and a molar amount equivalent to the total amount of (c) and (d) of component (b). Advantageously the polyether esters contain as component (c) from 5 to 15 mol % of repeat units of the formula III or of a mixture of repeat units of the formulae III and IV.

Preferred wholly aromatic liquid-crystalline polyether esters have a glass transition temperature of $\geq 140°$ C., in particular $\geq 150°$ C. This glass transition temperature is measured by the DSC method as described by K. H. Illers et al. in Makromol. Chem. 127 (1969), 1 ff. The liquid-crystalline polyether esters according to the invention form a liquid-crystalline fiber-forming melt at below 320° C., in particular at below 300° C.

The liquid-crystalline polyether esters according to the invention can be obtained by a number of techniques as described for example in U.S. Pat. Nos. 4,375,530 and 4,118,372.

In an advantageous embodiment, the polyether esters according to the invention are obtained in a single-stage process by converting the underivatized starting materials using anhydrides of lower fatty acids, for example fatty acids of 2 to 4 carbon atoms, in particular acetic anhydride. This reaction may also be catalyzed with catalysts of the type described in EP-A-No. 131,846, page 9, used in amounts of from 0.001 to 1% by weight. The starting materials are expediently heated together with the fatty acid anhydride, advantageously in a molar excess of not less than 5%, based on the hydroxyl groups present, with stirring in an inert gas atmosphere to a temperature at which reflux occurs. In the heating up, advantageously a temperature of from 130 to 170° C. is maintained for not more than 5 hours, in particular up to 2 hours. The temperature is then raised to 250°-350° C., while excess fatty acid anhydride and fatty acid are distilled off. To remove the fatty acid formed in the course of the reaction it is advantageous to employ reduced pressure, for example from 300 to 0.1 mbar, toward the end of the condensation.

It is a remarkable and unforeseeable feature of this single-state process that the desired polymers are obtained in a relatively short time in a troublefree and complete reaction even without catalysts. This is all the more remarkable because the large number of chemically different hydroxyl groups would be expected to lead to differences in reactivity and hence to inadequate polymer synthesis.

The wholly aromatic liquid-crystalline polyether esters thus obtained can be condensed further in the solid state, for example at 150°-250° C., until the desired viscosity is obtained. The further condensation can be carried out not only before but also after thermoplastic processing.

The polyether esters of the invention can be modified by adding active amounts of additives such as stabilizers, oxidation inhibitors, agents against thermal decomposition and decomposition by ultraviolet light, colorants such as dyes and pigments, fibrous and pulverulent fillers and reinforcing agents.

The stabilizers can be added to the polymers at any stage of processing or when completed. Preferably the stabilizers are added early on to prevent the onset of decomposition before the polymers are protected.

The oxidation inhibitors and heat stabilizers which can be added to the polyether esters of the invention include those which are generally added to polymers, such as halides of metals of group I of the periodic table, for example of sodium, potassium or lithium, with copper(I) halides such as chlorides, bromides, or iodides, and also sterically hindered phenols, hydroquinones and various substituted representatives of these groups and combinations thereof in concentrations up to 1% by weight, based on the polyether esters.

The UV stabilizers, used in amounts of up to 2.0% by weight, based on the polyether ester, can likewise be those which are generally added to polymers. Examples of UV stabilizers are various substituted resorcinols, salicylates, benzotriazoles, benzophenones and the like.

It is also possible to add organic dyes such as nigrosine, pigments such as titanium dioxide, cadmium sulfide, cadmium sulfide selenide, phthalocyanines, ultramarine blue and carbon black, and also fibrous and pulverulent fillers and reinforcing agents such as carbon fibers, glass fibers, amorphous silica, asbestos, calcium silicate, aluminum silicate, magnesium carbonate, kaolin, chalk, quartz powder, mica or feldspar in amounts of up to 70% by weight, and also nucleating agents such as talcum, calcium fluoride, sodium phenylphosphinate, aluminum oxide and finely divided polytetrafluoroethylene. Suitable additives also include plasticizers in amounts up to about 20% by weight, such as dioctyl phthalate, dibenzyl phthalate, butyl benzyl phthalate, hydrocarbon oils, N,N-butylbenzenesulfonamide, and o- and p-toluene-ethylsulfonamide etc. Colorants such as dyes and pigments can be used in amounts of up to 5% by weight.

The wholly aromatic liquid-crystalline polyether esters according to the invention are suitable for preparing filaments, films, foams and industrial moldings by injection molding or extruding.

The moldings prepared from the polyether esters according to the invention have excellent mechanical properties such as stiffness, strength and resilience. They are remarkably resistant to chemicals and in addition flame-retardant. They also have a high heat distortion resistance and a smooth abrasion-resistant surface. The polyether esters according to the invention are therefore highly suitable for preparing moldings for electrical engineering, data processing, automotive construction and other industrial sectors. But they can also be used as coating agents, in the form of a pulverulent dispersion or as a film.

The invention is illustrated by the following examples.

EXAMPLE 1

0.2 mol of terephthalic acid, 0.2 mol of p-hydroxybenzoic acid, 0.05 mol of hydroquinone and 0.15 mol of compound

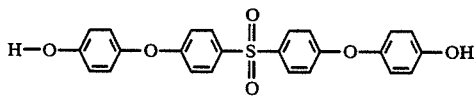

as well as 100 ml of acetic anhydride are refluxed with stirring under nitrogen at a bath temperature of 150° C. for 45 minutes. The temperature is then raised from 150° C. to 350° C. at one go in the course of 3 h 50 min, while excess acetic anhydride and acetic acid are distilled off.

The pressure is then reduced to 190 mbar at 350° C. in the course of 45 min to give a highly viscous fiber-forming melt. The polymer melt and the cold polymer have a pearlescent luster. The polymer has a smooth, hard and abrasion-resistant surface.

DSC measurement indicates a glass transition temperature of 150° C. The intrinsic viscosity of the polymer is 0.88 dl/g, measured at 60° C. in a 0.1% strength (wt./vol.) solution in pentafluorophenol.

Viewed between crossed polarizers under a polarization microscope, the polymer exhibits textures typical of liquid-crystalline polymers. The polymer can be processed from the melt at 300° C.

EXAMPLE 2

0.2 mol of terephthalic acid, 0.3 mol of p-hydroxybenzoic acid, 0.05 mol of hydroquinone and 0.15 mol of compound

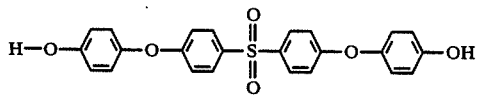

as well as 120 ml of acetic anhydride are condensed by the method described in Example 1.

The polymer has a smooth, hard and abrasion-resistant surface with a pearlescent luster. DSC measurement indicates a glass transition temperature of 165° C. The intrinsic viscosity of the polymer is 0.93 dl/g. The polymer can be processed from the melt at 320° C.

EXAMPLE 3

0.2 mol of terephthalic acid, 0.3 mol of p-hydroxybenzoic acid, 0.05 mol of 4,4'-dihyroxybiphenyl and 0.15 mol of the compound

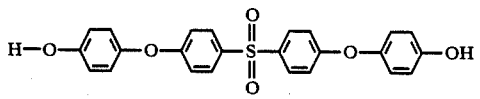

as well as 100 ml of acetic anhydride are condensed by the method described in Example 1.

The polymer has a smooth, hard and abrasion-resistant surface with a pearlescent luster. DSC measurement indicates a glass transition temperature of 155° C. The intrinsic viscosity of the polymer is 0.89 dl/g.

EXAMPLE 4

0.2 mol of terephthalic acid, 0.3 mol of p-hydroxybenzoic acid, 0.05 ol of hydroquinone, 0.05 mol of 4,4'-dihydroxybiphenyl and 0.15 mol of compound

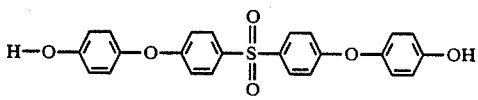

and 120 ml of acetic anhydride are condensed by the method described in Example 1. The final temperature is in this case only 300° C.

The polymer has a smooth, hard and abrasion-resistant surface with a pearlescent luster. DSC measurement indicates a glass transition temperature of 155° C. The intrinsic viscosity of the polymer is 0.86 dl/g.

EXAMPLE 5

(comparison)

0.3 mol of terephthalic acid, 0.18 mol of hydroquinone, 0.03 mol of 4,4'-dihydroxybiphenyl, 0.09 mol of compound

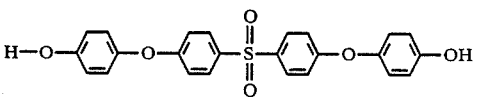

and 80 ml of acetic anhydride are condensed by the method described in Example 1.

The polymer, the composition of which is outside the claimed range, has a gray color, an unlustrous surface and a pasty consistency. On rubbing, particles become detached from the surface.

We claim:

1. A wholly aromatic mesomorphic polyester which forms a liquid-crystalline fiber-forming melt below 320° C. and is composed of
   (a) not less than 10 mol % of repeat units of the formula I

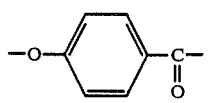

(b) a molar amount equivalent to the total amount of components (c) and (d) of repeat units of the formula II

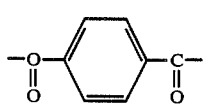

(c) from 3 to 20 mol % of repeat units of the formulae III and/or IV

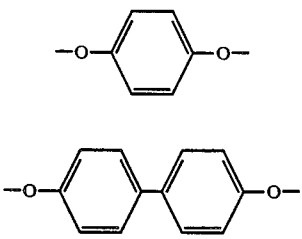

and (d) from 5 to 30 mol % of repeat units of the formula V

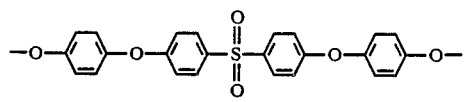

the molar proportions of components a, b, c and d adding up to 100 mol % in each case.

2. A wholly aromatic mesomorphic polyether ester as defined in claim 1, composed of (a) not less than 20 mol % of repeat units of the formula I,
(b) a molar amount equivalent to the total amount of components (c) and (d) of repeat units of the formula II,
(c) from 5 to 15 mol % of repeat units of the formulae III and/or VI and
(d) from 10 to 25 mol % of repeat units of the formula V.

3. A wholly aromatic mesomorphic polyether ester as defined in claim 1, which has a glass transition temperature $Tg \geq 140°$ C.

4. A process for preparing a wholly aromatic mesomorphic polyether ester as defined in claim 1 which comprises reacting the monomeric starting materials in one stage in the form of the underivatized hydroxy or carboxy compounds in the molar ratios described in the presence of excess fatty acid anhydride at elevated temperatures and distilling off fatty acid anhydride and fatty acid out of the reaction mixture.

5. The process of claim 4, wherein the wholly aromatic mesomorphic polyester is postcondensed in the solid phase at 150°–250° C.

6. A molding from a polyether ester as claimed in claim 1.

7. A coating from a polyether ester as claimed in claim 1.

* * * * *